(12) United States Patent
Gordon et al.

(10) Patent No.: US 6,623,548 B1
(45) Date of Patent: Sep. 23, 2003

(54) FILTER MATERIALS AND METHODS FOR THE PRODUCTION THEREOF

(75) Inventors: John Gordon, Stalybridge (GB); Jeremy Andrew Collingwood, Hest Bank (GB); Martyn Peter Kennaugh, Kendal (GB)

(73) Assignee: Hollingsworth & Vose Air Filtration Limited (GB)

( * ) Notice: Subject to any disclaimer, the term of this patent is extended or adjusted under 35 U.S.C. 154(b) by 0 days.

(21) Appl. No.: 09/646,338

(22) PCT Filed: Jun. 24, 1999

(86) PCT No.: PCT/GB99/01990

§ 371 (c)(1),
(2), (4) Date: Sep. 15, 2000

(87) PCT Pub. No.: WO00/04216

PCT Pub. Date: Jan. 27, 2000

(30) Foreign Application Priority Data

Jul. 18, 1998 (GB) .............................................. 9815629

(51) Int. Cl.⁷ .............................................. B03C 3/155
(52) U.S. Cl. ........................ 96/15; 55/528; 55/DIG. 5; 55/DIG. 39; 96/17; 96/66; 264/211.17; 264/DIG. 48
(58) Field of Search ............................... 96/15, 66, 17, 96/98, 55; 55/527, 528, DIG. 39, DIG. 5; 264/211.17, DIG. 48

(56) References Cited

U.S. PATENT DOCUMENTS

| | | | | |
|---|---|---|---|---|
| 4,798,850 A | | 1/1989 | Brown | 210/500.23 X |
| 5,013,502 A | * | 5/1991 | Reinehr et al. | 264/211.17 X |
| 5,419,953 A | | 5/1995 | Chapman | 96/15 X |
| 5,470,485 A | | 11/1995 | Morweiser et al. | 96/55 X |
| 5,898,981 A | | 5/1999 | Legare | 28/111 |

FOREIGN PATENT DOCUMENTS

| | | | | |
|---|---|---|---|---|
| EP | 246811 | * | 11/1987 | |
| GB | 384052 | * | 12/1932 | ............ 55/DIG. 39 |
| WO | 97/40913 | * | 11/1997 | |

OTHER PUBLICATIONS

Agronett, Derwent Abstract, XP–002119337, AN 1992–099226, HU 58214A, Feb. 28, 1992.*

International Search Report, Oct. 19, 1999.

* cited by examiner

*Primary Examiner*—Richard L. Chiesa
(74) *Attorney, Agent, or Firm*—Bracewell & Patterson, LLP

(57) ABSTRACT

An electrostatically charged filter material including a blend of polypropylene fibres and one selected from the group consisting of: halogen free acrylic fibres; polyvinyl chloride fibers or a mixture of halogen free acrylic fibres and polyvinyl chloride fibres.

13 Claims, 1 Drawing Sheet

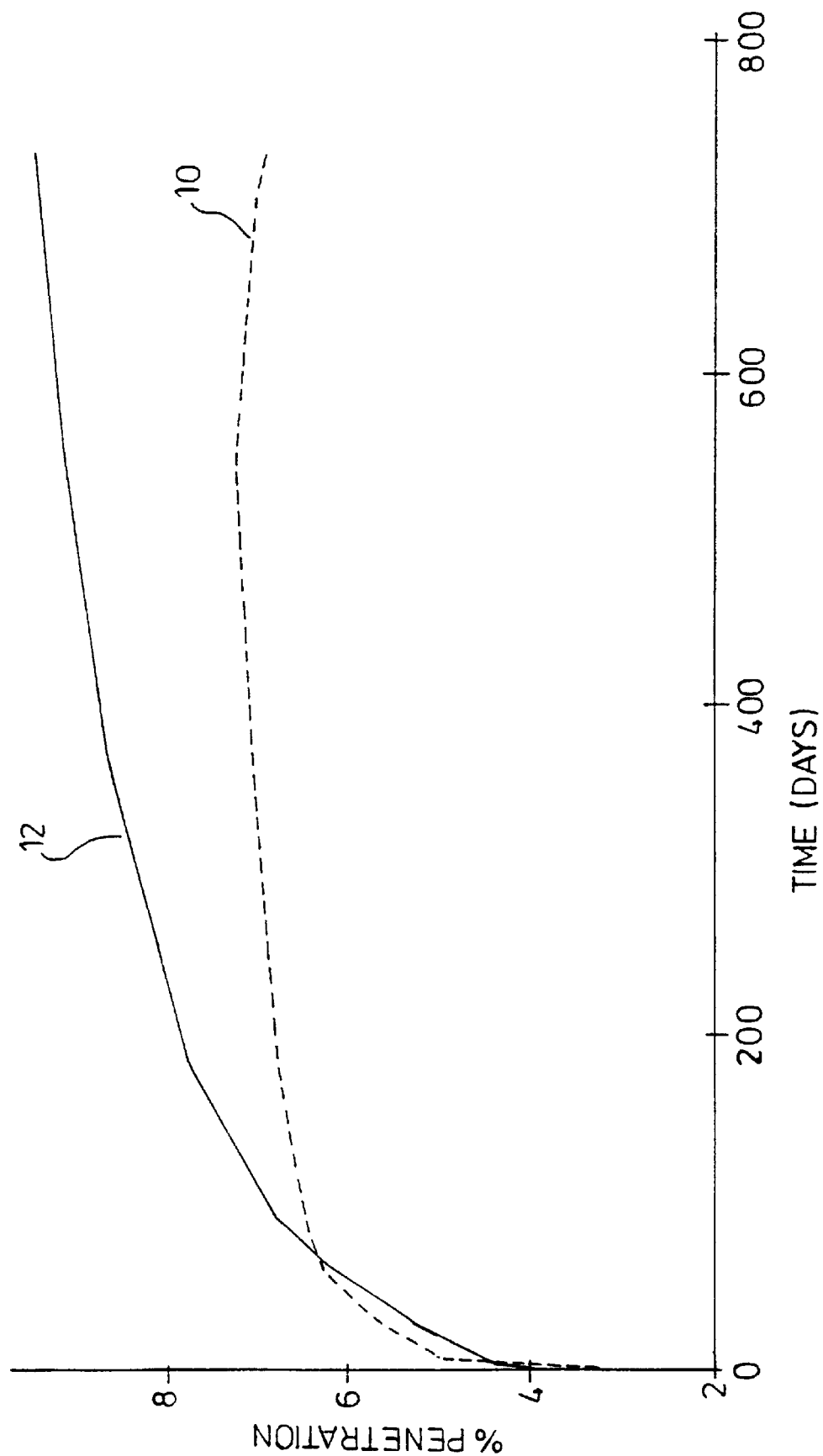

FILTER MATERIALS AND METHODS FOR THE PRODUCTION THEREOF

This application is a national stage application of International Application No. PCT/GB99/01990, filed on Jun. 24, 1999.

BACKGROUND OF THE INVENTION

This invention relates to filter materials for filtering fluids and methods for the production thereof, with particular, but by no means exclusive, reference to filters for air filtration.

Air filter materials having permanent electrostatic charge are known. Such materials filter particles very efficiently due to electrostatic attractive forces between the material and the particles to be filtered. Applications include air filtration in dust helmets, respirators suction cleaners and air conditioning systems.

Filter materials desirably possess a number of advantageous properties. Such materials should filter particles efficiently while providing low resistance to the flow of fluid through the filter material. In the case of air filtration, this means a low air pressure drop across the filter material. Furthermore, it is important that the filtering performance of the filtering material is maintained, or, at least, that deterioration in performance is minimised, for as long a period of time as possible. In this way, the working lifetime of the filter is extended. Furtherstill, it is important that, once the working lifetime of the filter is over, the filter can be disposed of safely.

European Patent EP 0 246 811 describes air filter material which exhibit good filtration efficiency and low resistance to air flow due to the open structure of charged fibres employed. The material comprises a blend of polyolefine fibres and halogen substituted polyolefine fibres. U.S. Pat. No. 5,470,485 describes air filter material comprising a blend of bi-component polypropylene polyethylene fibres of the core/jacket or side-by-side type and halogen free polyacrionitrile fibres. The use of the bi-component fibres is an essential element of U.S. Pat. No. 5,470,485 so that stiff, mouldable non-woven mats of filter material can be produced. It should be noted that in each case the filter material is overall electrically neutral, fibres in the materials of different type carrying charges of opposed polarities.

SUMMARY OF THE INVENTION

The present invention provides high quality filter material which exhibits some or all of the advantageous properties described above.

According to a first aspect of the invention there is provided an electrostatically charged filter material comprising a blend of polypropylene fibres and: i) halogen free acrylic fibres or ii) polyvinyl chloride (PVC) fibres or iii) a mixture of halogen free acrylic fibres and PVC fibres.

Such filter materials exhibits excellent filtering efficiency and low resistance to the flow of fluids through the material.

Preferably, the halogen free acrylic fibres are produced by dry spinning. In a dry spinning process, the acrylic polymer is formed into fibres by extrusion into an air stream. It has been found that the filter material comprising such fibres exhibit improved filtration efficiency and better long term charge stability.

The filter material may consist of a blend of polypropylene fibres and halogen free acrylic fibres. In contrast to the filter material of EP 0 246 811, such material may be safely disposed of by incineration, since dioxin compounds are not produced.

The filter material may consist of a blend of polypropylene fibres and PVC fibres. Such material exhibits excellent long term charge stability, leading to excellent filter performance e over an extended time period.

The filter material may consist of a blend of polypropylene fibres halogen free acrylic fibres and PVC fibres. The presence of the PVC fibres in the blend provides enhanced performance over an extended time period.

The halogen free acrylic fibres may comprise at least 40%, preferably at least 50%, more preferably at least 60%, most preferably at least 85% acrylonitrile.

According to a second aspect of the invention there is provided a method for producing an electrostatically charged filter material comprising the step of blending together polypropylene fibres and: i) halogen free acrylic fibres or ii) PVC fibres or iii) a mixture of halogen free acrylic fibres an d PVC fibres.

The performance of the filter material is considerably affected by the present of lubricants and anti-static agents (collectively known as a "spin finish") on the surface of the fibres. In practise, polymer fibres produced commercially have spin finishes, and thus it is necessary to substantially remove lubricants and anti-static agents from the fibres before, during or a after the blending of said fibres.

The method may comprise the step of carding the blend of fibres so as to form a non-woven fabric. The non-woven fabric may be needled.

The halogen free acrylic fibres may be produced by dry spinning.

Polypropylene fibres may be blended with halogen free acrylic fibres but not with PVC fibres.

Polypropylene fibres may be blended PVC fibres but not with halogen free acrylic fibres.

Polypropylene fibres may be blended with halogen free acrylic fibres and PVC fibres.

BRIEF DESCRIPTION OF THE DRAWING

Filter materials and methods for the product thereof will now be described with reference to the accompanying Figure, which shows penetration characteristics for two filter materials as a function of time.

The invention comprises a filter material comprising a blend of polypropylene fibres and: i) halogen free acrylic fibres or ii) PVC fibres or iii) a mixture of halogen free acrylic fibres and PVC fibres.

Filter material corresponding to each of options i), ii) and iii) was produced by a method described in more detail below. Filter material made from blends of polypropylene/halogen free acrylic and polypropylene/PVC were produced with blend ratios (by weight) of 50:50. Additionally, filter material was made from a blend of polypropylene/halogen free acrylic/PVC with a blend ratio of 50:25:25. However, it should be appreciated that the invention is not limited in this respect: different blend ratios may be employed. In general, a blend ratio of polypropylene/[acrylic +PVC] in the range of 70:30 to 30:70 is acceptable. There is economic advantage in using blend ratios in which the polypropylene component predominates, since this is the cheaper material. The ratio of halogen free acrylic to PVC is fully variable across the range 100:0 (all acrylic, corresponding to option i)) to 0:100 (all PVC, corresponding to option ii). However, the term "polypropylene fibres" is understood not to include bi-component fibres, such as the core/jacket or side-by-side type polypropylene/polypropylene fibres described in U.S. Pat. No. 5 470 485, which give rise to filter material having different physical properties.

DETAILED DESCRIPTION OF THE PREFERRED EMBODIMENT

The present invention recognises that the cleanliness of the fibres is of great importance if good filtering performance is to be obtained. In particular, there appears to be a relationship between the surface characteristics of the fibres used and long term performance of the filtering material. Fibres having surfaces that contain significant cracks and fissures generally produce inferior filtering material. It is likely that this is due, at least in part to the difficulty of removing spin finish (and, possibly, water) from the cracks and fissures. Thus, it is preferable to utilise halogen free acrylic fibres which have been produced by dry spinning, in which the polymer is formed into fibres by extrusion into an air stream. Scanning electron microscopy has confirmed that fibres produced thereby are smoother and have less deformations than fibres produced by a wet spinning process, in which polymer solution is extruded into a coagulation bath. In the examples described herein, dry spun acrylic was used.

Filter material was produced generally according to the method described in EP 0 246 811. It should be noted that, in EP 0 246 811, removal of lubricants and anti-static agents is accomplished before blending of said fibres. The present examples this removal step is performed after the step of blending the fibres. Both approaches are within the scope of the invention. The removal of lubricants and anti-static agents can be performed by a textile scouring process, such as detergent, alkali or solvent scouring. It is preferred to use a detergent scouring process followed by rinsing and drying of the fibres.

The blend is then carded, a process which i) forms a non-woven fabric and ii) enables the fibres to acquire electrical charge. After carding, needling of the non-woven fabric is performed in order to produce a felt product. The needling process also acts to enhance the charge on the web.

The Table shows the efficiency of filter materials described above. The efficiency is the percentage of particles borne in an air flow passing through the filter material which are trapped by the filter material. The tests to determine the efficiencies of the filter materials were performed according to the British Standard BS 4400 test. A 2 g mass of the material in question, in standard capsule form, was tested using sodium chloride particles of 0.65 μm mean diameter.

| Blend | Efficiency/% |
|---|---|
| polypropylene/halogen free acrylic | 99.25 |
| polypropylene/PVC | 99.0 |
| polypropylene/halogen free acrylic/PVC | 99.25 |

Thus all of the embodiments exhibit excellent filtering efficiencies.

Commercially produced filter materials made according to EP 0 246 811 utilise modacrylic as the halogen substituted polyolefine: indeed, modacrylic is the preferred fibre in EP 0 246 811. However, modacrylic suffers the disadvantage that, when incinerated, it produces highly toxic dioxins at unacceptably high concentrations. This is a considerable problem, because ISO 14000 standards, which cover a variety of environmental concerns, have been applied to the disposal of used air filtration materials. In some countries, notably in the Far East, legislation requires that such disposal is carried out by incineration. The polypropylene/halogen free acrylic blend described herein does not produce dioxins when incinerated, since halogen substituents are not present in the fibres. A further advantage is that acrylic fibres are cheaper than modacrylic fibres.

The polypropylene/PVC blend exhibits considerably improved performance over a period of time compared to the modacrylic filter material which represents the preferred embodiments of EP 0 246 811. The Figure shows % penetration curves 10, 12 over an extended time period for, respectively, the polypropylene/PVC blend and a polypropylene/modacrylic blend (the preferred embodiment of EP 0 246 811). The % penetration represents the percentage of air particles passing through the filter material in an air flow (and therefore the efficiency value=100% minus the % penetration). The polypropylene /PVC blend stabilises at a penetration value of ca. 7.1%. In contrast, the polypropylene/modacrylic blend exhibits considerably higher penetration values, reaching ca. 9.5%. Furthermore, the performance of the polypropylene/modacrylic blend is not stable over time rather, it appears to be increasing steadily. The results shown in the Figure indicate that filters made from the polypropylene/PVC blend will have excellent working lifetimes. The working lifetime is given by the time period in which a filter can perform to within a specified standard. The Figure, shows that if, for example, an application requires that the penetration is 8% or better, the polypropylene/modacrylic blend would only be suitable for ca. 224 days. In contrast, the polypropylene/PVC blend is still performing with this specification at the end of the present study, i.e. after 728 days, with the likelihood that this performance will be maintained for a considerably longer period of time.

Since PVC contains chloride substituents, it is possible that incineration of the polypropylene/PVC filter material will produce dioxins. It is not known whether any toxic substances produced by incineration of this material will be present in acceptable concentrations.

Blends comprising polypropylene with PVC and halogen free acrylic fibres are within the scope of the invention. The efficiency of this material is excellent, and the PVC component provides enhanced performance over an extended period of time. By including a component of halogen free acrylic, the amount of PVC in the material is reduced and thus the concentration of any dioxins produced by incineration of the material is reduced.

In the examples described above, fibres of "standard" diameters, i.e., ca. 2–3 denier, were employed. The invention is not limited in this regard, and, in fact, it is likely that variation of fibre characteristics will result in variations in the characteristics of the filter material. "Coarse" denier fibres are, roughly speaking, of 5 denier and above, whilst fine denier fibres are, roughly speaking, 1.5 denier and below. Fibres of different coarseness can be blended. It should be noted that there are other factors than efficiency to consider, such as the pressure drop across the filter material, and the cost and/or weight of filter material required to obtain a desired performance characteristic. Variation of fibre coarseness is one way in which such factors might be optimised.

What is claimed is:

1. A filter material having enhanced electrostatic charge, high efficiency characteristics when filters are formed therefrom, and a significantly reduced risk of dioxins being emitted when incinerated, the filter material comprising:

a blend of polypropylene fibres and dry spun halogen free acrylic fibres, the dry spun halogen free acrylic fibres having substantially smooth surfaces to thereby have significantly reduced cracks and fissures in the surfaces of the acrylic fibres than if produced by wet spinning and significantly reduce the risk of dioxins being emitted when incinerated, the blend being substantially devoid of lubricants and anti-static agents on surfaces of the fibres to thereby further enhance the electrostatic charge of the blended fibres.

2. A filter material according to claim 1 consisting of a blend of polypropylene fibres and dry spun halogen free acrylic fibres.

3. A filter material according to claim 2 in which the ratio by weight of polypropylene fibres to dry spun halogen free acrylic fibres is in the range 70:30 to 30:70.

4. A filter material according to claim 1 consisting of a blend of polypropylene fibres, dry spun halogen free acrylic fibres, and polyvinyl chloride fibres.

5. A filter material according to claim 4 in which the ratio by weight of polypropylene fibres to the weight of dry spun halogen free acrylic fibres and polyvinyl chloride fibres is in the range 70:30 to 30:70.

6. A filter material according to claim 1 in which the dry spun halogen free acrylic fibres comprise between 40% and 85% acrylonitrile.

7. A method for producing filter material having enhanced electrostatic charge, high efficiency characteristics when filters are formed therefrom, and a significantly reduced risk of dioxins being emitted when incinerated, the method comprising the steps of:

producing dry spun halogen free acrylic fibres having substantially smooth surfaces to thereby significantly reduce cracks and fissures in the acrylic fibres than if produced by wet spinning and to significantly reduce the risk of dioxins being emitted when incinerated;

blending together polypropylene fibres and the dry spun halogen free acrylic fibres; and removing lubricants and anti-static agents from surfaces of the polypropylene fibres and the dry spun halogen free acrylic fibres before, during, or after blending with the halogen free acrylic fibres to thereby further enhance the electrostatic charge of the blended fibres.

8. A method according to claim 7 comprising the step of carding the blend of fibres so as to form a non-woven fabric.

9. A method according to claim 8 in which the non-woven fabric is needled.

10. A method according to claim 7 in which polypropylene fibres are blended with the dry spun halogen free acrylic fibres but not with polyvinyl chloride fibres.

11. A method according to claim 10 in which the ratio by weight of polypropylene fibres to dry spun halogen free acrylic fibres is in the range of 70:30 to 30:70.

12. A method according to claim 7 in which the polypropylene fibres are blended with the dry spun halogen free acrylic fibres and polyvinyl chloride fibres.

13. A method according to claim 12 in which the ratio by weight of polypropylene fibres to the weight of the dry spun halogen free acrylic fibres and polyvinyl chloride fibres is in the range 70:30 to 30:70.

* * * * *